(12) United States Patent
Niiyama et al.

(10) Patent No.: US 6,882,790 B2
(45) Date of Patent: Apr. 19, 2005

(54) OPTICAL FIBER ARRAY AND SUBSTRATE FOR THE OPTICAL FIBER ARRAY

(75) Inventors: Shinsuke Niiyama, Yokohama (JP); Yukihiro Yokomachi, Yokohama (JP); Hiroki Itakura, Aichi-ken (JP)

(73) Assignees: Sumitomo Electric Industries, Ltd., Osaka (JP); Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 10/670,136

(22) Filed: Sep. 24, 2003

(65) Prior Publication Data

US 2004/0165854 A1 Aug. 26, 2004

(30) Foreign Application Priority Data

Sep. 25, 2002 (JP) ........................................ 2002-278308
Sep. 25, 2002 (JP) ........................................ 2002-278386

(51) Int. Cl.[7] .................................................. G02B 6/00
(52) U.S. Cl. ...................................................... 385/137
(58) Field of Search ............................ 385/137, 65, 99, 385/76, 83, 88

(56) References Cited

U.S. PATENT DOCUMENTS

| 6,549,713 B1 * | 4/2003 | Pi et al. ........................ 385/137 |
| 6,553,173 B1 * | 4/2003 | Goto ........................... 385/137 |
| 2001/0024560 A1 * | 9/2001 | Inoue ........................... 385/137 |
| 2002/0009268 A1 * | 1/2002 | Matsumoto et al. ........... 385/80 |
| 2002/0097974 A1 * | 7/2002 | Matsumoto et al. ......... 385/137 |
| 2003/0012544 A1 * | 1/2003 | Matsumoto et al. ......... 385/137 |
| 2003/0021573 A1 * | 1/2003 | Matsumoto et al. ......... 385/137 |

FOREIGN PATENT DOCUMENTS

| JP | 2000-275478 A1 | 10/2000 |
| JP | 2001-343547 A1 | 12/2001 |

* cited by examiner

*Primary Examiner*—J. F. Duverne
(74) *Attorney, Agent, or Firm*—Browdy and Neimark, P.L.L.C.

(57) ABSTRACT

An optical fiber array including a substrate having a grooved portion and a planar portion which are formed integrally on opposite sides of a shoulder, and wherein the grooved portion has a plurality of grooves each defined by two side walls forming a predetermined angle therebetween, and a plurality of optical fibers are accommodated within the respective grooves and supported by the planar portion. Each of the optical fibers accommodated in the grooves is forced onto the two side walls by a covering plate disposed on the grooved portion, and thereby positioned. A gap having a transverse cross sectional surface area S1 is formed between each optical fiber and the upper surface of the substrate, while a gap having a transverse cross sectional surface area S2 is formed between each groove and the optical fiber, such that the area S1 is larger than the area S2, and the gaps between the optical fiber and the substrate and covering plate are filled with an adhesive agent to integrally bond the optical fibers to the substrate.

17 Claims, 7 Drawing Sheets

OPTICAL FIBER ARRAY AND SUBSTRATE FOR THE OPTICAL FIBER ARRAY

This application is based on Japanese Patent Application Nos. 2002-278308 and 2002-278386 both filed on Sep. 25, 2002, the contents of which are incorporated hereinto by reference.

BACKGROUND OF THE INVENTION

1. Field of the Invention

The present invention relates to an optical fiber array including a substrate and a plurality of optical fibers positioned relative to the substrate and integrally bonded to the substrate with an adhesive agent, and an improvement in the construction of the substrate of the optical fiber array.

2. Discussion of Related Art

As well known in the art, an optical fiber array includes a plurality of optical fibers which are fixedly arranged in parallel with each other with a predetermined pitch. For example, the optical fiber array is connected to a planar lightwave circuit (PLC), or used for connecting two multicore optical fiber cables.

Figure 1A:
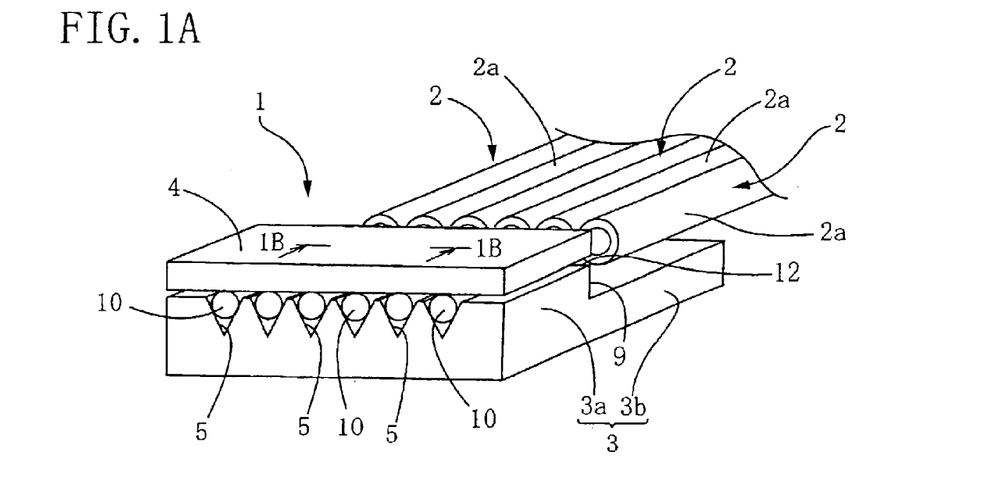
FIG. 1A is a schematic perspective view showing a conventional optical fiber array.
Figure 1B:
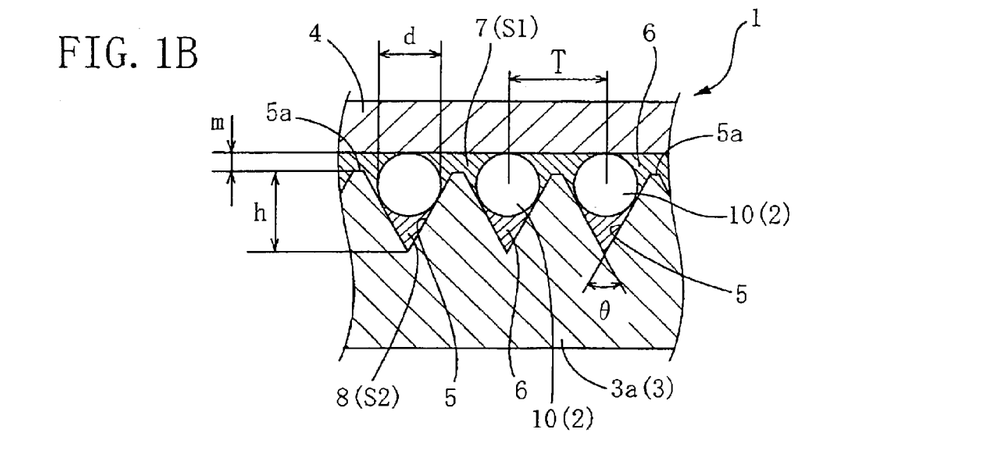
FIG. 1B is an enlarged cross sectional view taken along line 1B—1B of FIG. 1A.

Such an optical fiber array generally includes an substrate 3 for optical fiber array having a shoulder 9 formed at a longitudinally intermediate position thereof so as to define a thick portion on one side of the shoulder 9, as shown in FIGS. 1A and 1B. In this substrate 3 for optical fiber array, the thick portion serves as a grooved portion 3a having a plurality of V-shaped grooves 5 formed in its upper surface such that the V-shaped grooves 5 are arranged in parallel with each other, while the other thin portion is provided as a planar portion 3b having a flat upper surface.

Further, the planar portion 3b of the substrate 3 for optical fiber array supports a plurality of optical fibers 2 at their covered portions 2a, while the plurality of V-shaped grooves 5 accommodate the respective optical fibers 2 at their non-covered end portions 10 extending from the covered portions 2a, such that the optical fibers 2 are spaced from each other at a predetermined spacing pitch T and such that each optical fiber 2 is positioned at three points by two side surfaces of the corresponding V-shaped groove 5 and a retainer surface of a covering plate 4 disposed on the grooved portion 3a. In this condition, the plurality of optical fibers 2 are embedded in adhesive layers 6 (not shown in FIG. 1A) formed between the covering plate 4 and the grooves 5 and on the planar portion 3b, and are thus fixed to the covering plate 4 and the substrate 3 for optical fiber array, whereby the optical fiber array 1 is obtained. An example of this optical fiber array is disclosed in JP-2001-343547A. In an optical fiber array 1 shown in FIG. 2, the spacing pitch T of the optical fibers 2 is close to the diameter of each optical fiber 2, so that the optical fiber array 1 has a relatively high density of arrangements of the optical fibers 2.

To manufacture the optical fiber array 1 constructed as described above, an adhesive agent for forming the adhesive layers is injected into each groove 5 through a distal open end of the groove 5 located at the distal end of the substrate 3 for optical fiber array (which open end is remote from the shoulder 9), so that owing to capillarity, the injected adhesive agent fills a gap 7 left between the grooved portion 3a of the substrate 3 and the covering plate 4, and a gap 8 left between the optical fiber 2 accommodated in each groove 5 and the side surfaces of the groove 5. Where the upper gap 7 located above the optical fiber has a cross sectional surface area S1 which is smaller than a cross sectional surface area S2 of the lower gap 8 located below the optical fiber, a velocity at which the adhesive agent is introduced into the upper gap 7 is higher than a velocity at which the adhesive agent is introduced into the lower gap 8.

Figure 3:
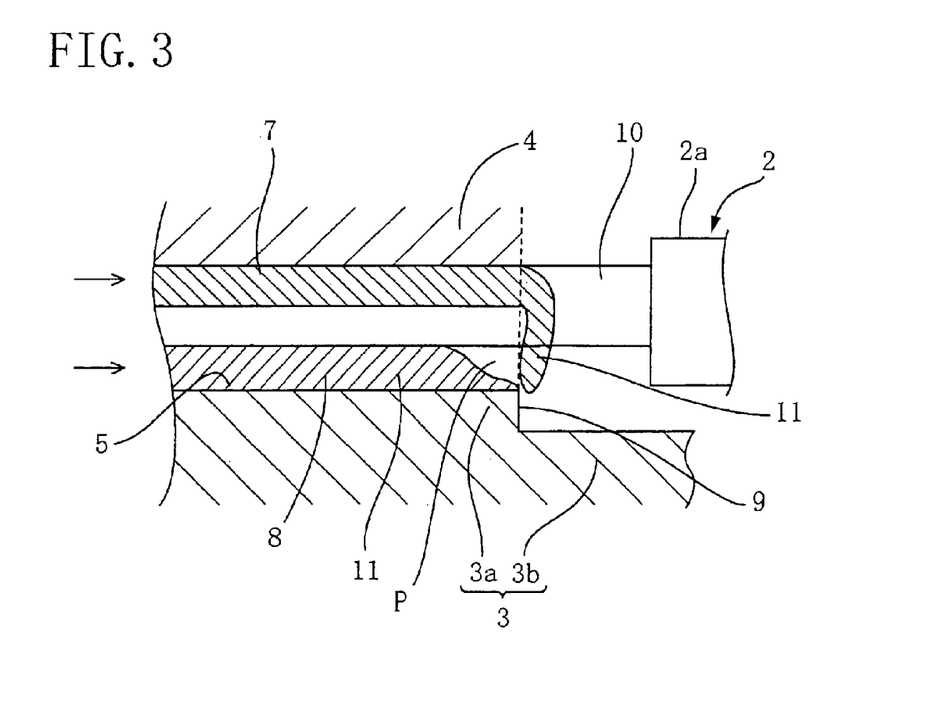
FIG. 3 is a schematic view in longitudinal cross section showing an example of a process of manufacturing the conventional optical fiber array, and illustrating a flow of an adhesive agent through gaps between a substrate and a covering plate, when the adhesive agent is injected into the gaps through open ends of the gaps on the distal end of the substrate.

In the above-described case, the adhesive agent 11 introduced into the upper gap 7 reaches a rear open end of the groove at the rear end of the grooved portion 3a (on the side of the shoulder 9) before the adhesive agent 11 introduced into the lower gap 8, as shown in FIG. 3, so that an excess amount of the adhesive agent 11 initiates a drooping flow from the rear open end of the upper gap 7 before the adhesive agent 11 introduced into the lower gap 8 has reached the rear open end. As a result, the rear open end of the lower gap 8 is closed by a mass of the adhesive agent 11 which has drooped from the rear open end of the upper gap 7, so that a volume of air P is trapped in the lower gap, resulting in not only reduction in a force of bonding of the optical fiber 2 to the substrate 3, which gives rise to a risk of removal of the optical fiber 2 from the substrate 3, but also bending or straining of the optical fiber 2 due to thermal expansion and contraction of the air P, which causes an increase in optical transmission loss of the optical fiber.

Where the optical fibers 2 are fixed to the substrate 3 for optical fiber array, with their portions being embedded in the adhesive layers 6 formed on the planar portion 3b of the fiber substrate 3 in the conventional optical fiber array 1, the optical fibers 2 may be subject to stress concentration by the adhesive layers 6 at the shoulder 9 located between the grooved portion 3a and the planar portion 3b of the substrate 3, or may be damaged or broken in the presence of the shoulder 9, that is, in contact with a rear edge 12 between the grooved portion 3a and the planar portion 3b.

Figure 4:
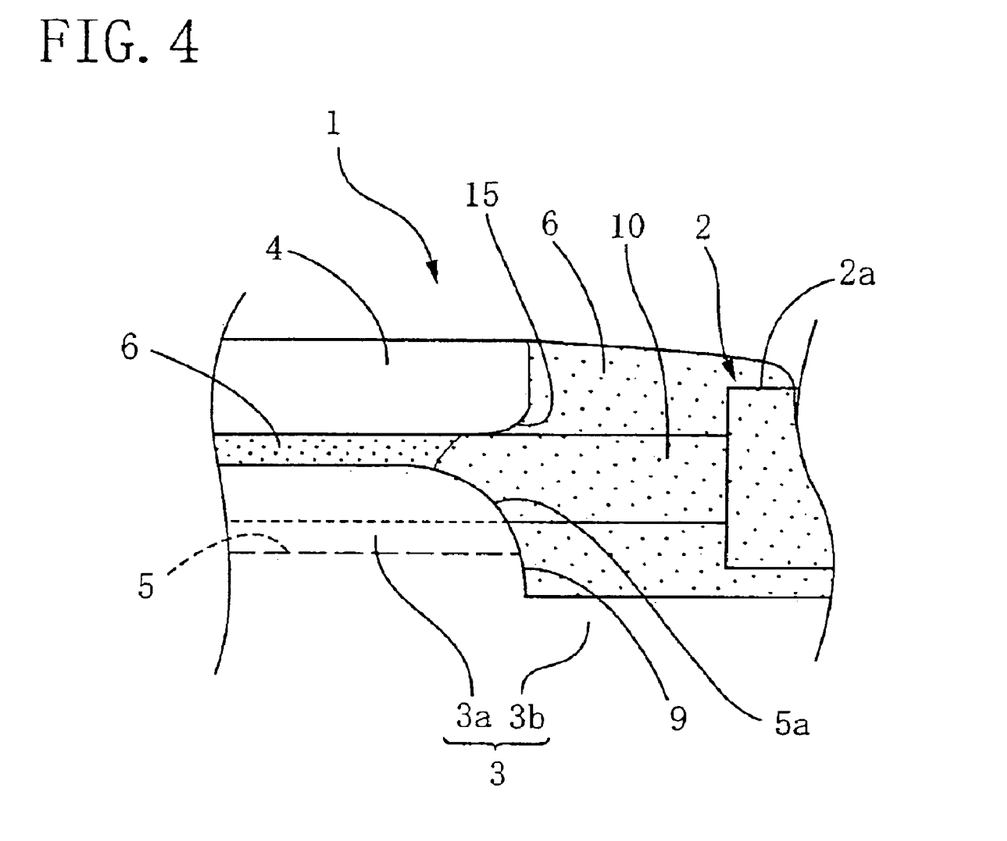
FIG. 4 is an enlarged view in longitudinal cross section showing a part of a conventional optical fiber array different from those shown in FIGS. 1A and 1B and FIG. 2.

JP-2000-275478A discloses an optical fiber array constructed so as to solve the problems discussed above. Namely, the grooved portion 3a of the optical fiber array disclosed in this publication has an upwardly convex rear end part formed adjacent to the shoulder 9, so that a crest 5a of each of two adjacent two walls defining each V-shaped groove 5 is rounded to have a relatively smooth curvature, in the reaar end part of the V-shaped groove 5 close to the shoulder 9, as shown in FIG. 4.

In the optical fiber array 1 constructed as described above, the stress acting on each optical fiber 2 due to the adhesive layers 6 gradually increases in a direction toward the shoulder 9, and the stress concentration at the rear edge 12 is prevented owing to a small amount of shift of a point of contact of the optical fiber 2 with the rear edge 12 toward the front end of the optical fiber 2, that is, owing to a shift of the stress point toward the front end of the optical fiber 2. Further, a length of contact of each optical fiber 2 with the rear edge 12 of the V-shaped groove 5 is increased owing to the curvature in the rear end part of the V-shaped groove 5, so that the stress acting on the optical fiber 2 is dispersed.

Although the conventional optical fiber array 1 described above is constructed to reduce the stress concentration at the shoulder 9 at the rear end of the grooved portion 3a, the contact of each optical fiber 2 with the rear edge 12 is inevitable, since angle θ of each V-shaped groove 5 defined by its two side surfaces and a depth h of the groove 5, which are indicated in FIG. 1B, are held constant over the entire length of the groove 5. Accordingly, the optical fiber array 1 has a risk of damaging of the optical fibers 2 at the rear edge 12 during assembling of the optical fiber array 1, or due to displacement of the optical fibers 2 upon a temperature change because of a difference in coefficient of thermal expansion between the optical fibers 2 and the adhesive layers 6.

SUMMARY OF THE INVENTION

The present invention was made in view of the background art discussed above. It is a first object of the present invention to provide an optical fiber array which is free from air trapping in the gaps to be filled with an adhesive agent, and a substrate suitable for this optical fiber array. A second object of this invention is to provide an optical fiber array which is constructed so as to effectively avoid a contact of the optical fibers with the rear edges of the grooves, and a substrate suitable for this optical fiber array.

The first object indicated above may be achieved according to the present invention, which provides an optical fiber array characterized by comprising (a) a substrate having a shoulder and including a grooved portion and a planar portion which are formed integrally with each other on respective opposite sides of the shoulder, (b) the grooved portion of the substrate having a plurality of grooves formed [in the grooved portion of the substrate] such that the plurality of grooves are arranged in parallel with each other and such that each of the plurality of grooves is defined by two side walls which form a predetermined angle therebetween, (c) a plurality of optical fibers partly accommodated within the plurality of grooves, respectively, and thereby positioned on the grooved portion, the plurality of optical fibers being supported by the planar portion of the substrate, (d) a covering plate disposed on the grooved portion of the substrate, to force the optical fibers partly accommodated in the plurality of grooves of the grooved portion, onto the two side walls of each groove, to thereby position the optical fibers, and (e) adhesive layers formed so as to fill gaps between the optical fibers and the substrate and between the optical fibers and the covering plate, for integrally bonding the optical fibers to the substrate and the covering plate, and wherein the gaps consists of a gap having a transverse cross sectional surface area S1 and formed between each of the optical fibers and an upper surface of the grooved portion of the substrate, and a lower surface of the covering plate, and a gap having a transverse cross sectional surface area S2 and formed between the two side walls of each of the grooves of the substrate and each optical fiber, the transverse cross sectional surface areas S1 and S2 being determined to satisfy and inequality S1>S2.

In essence, the optical fiber array of the present invention is constructed such that the transverse cross sectional area S1 of the gap between each optical fiber and the upper surface of the grooved portion of the substrate, and the lower surface of the covering plate, that is, of the upper gap located above each optical fiber is larger than the transverse cross sectional surface area S2 of the gap between the two side walls of each groove of the substrate and each optical fiber, that is, of the lower gap located below each optical fiber.

In the manufacture of the present optical fiber array, the optical fibers accommodated in the grooves of the substrate are integrally bonded to the substrate, by injecting an adhesive agent into each groove through a distal open end of the groove located at the distal end of the substrate remote from the shoulder, so that owing to capillarity, the injected adhesive agent fills the above-indicated upper gap and the above-indicated lower gap. At this time, the velocity at which the adhesive agent is injected into the lower gap is higher than the velocity at which the adhesive agent is injected into the upper gap. As a result, the adhesive agent injected into the lower gap reaches the rear open end of the groove on the side of the shoulder before the adhesive agent injected into the upper gap reaches the rear open end. After the lower gap is filled with the adhesive agent, the upper gap is filled with the adhesive agent 11. Accordingly, the present arrangement is effective to prevent trapping of air in the lower gap, and closure of the lower gap at its rear open end by a mass of the adhesive agent which has drooped from the rear end of the upper gap on the side of the shoulder.

In the absence of the air in the lower gap, the present optical fiber array is completely protected against reduction in the force of bonding of the optical fibers to the substrate 3, which gives rise to a risk of removal of the optical fibers from the substrate, bending or straining of the optical fibers due to thermal expansion and contraction of the air, which causes an increase in optical transmission loss of the optical fiber. Thus, the quality of the present optical fiber array is effectively improved.

In one preferred form of the optical fiber array of the present invention, each of the optical fibers has an outside diameter of 125 $\mu$m and the optical fibers are arranged with a spacing pitch of 127 $\mu$m. In this case, the angle formed between the two side walls of each groove is larger than 70° and smaller than 100°. This arrangement is more effective to prevent the removal of the optical fibers from the substrate and an increase in the optical transmission loss of the optical fibers, while assuring a high degree of stability of positioning of the optical fibers.

Preferably, each of the grooves in the present optical fiber array is a V-shaped groove, a groove having an inverted trapezoidal shape, or a U-shaped groove. In this instance, the transverse cross sectional surface area S1 of the upper gap can be advantageously made larger than the transverse cross sectional surface area S2 of the lower gap.

Where each optical fiber in the present optical fiber array is V-shaped groove as described above, it is preferable that the angle formed between the two side walls of the V-shaped groove is gradually increased in a portion of the grooved portion of the substrate on the side of the shoulder, or a distance between a nominal level of the upper surface of the grooved portion and a bottom of the V-shaped groove is gradually increased in a portion of the grooved portion of the substrate on the side of the shoulder. In this arrangement, each optical fiber partly accommodated in the V-shaped groove is spaced apart from the two side walls of the V-shaped groove, in the portion of the grooved portion on the side of the shoulder, and is not in contact with the rear edge of the V-shaped groove located at the shoulder, so that the optical fiber is protected against damaging or breaking due to contact of the optical fiber with the rear edge.

The first object indicated above may also be achieved according to the present invention, which provides a substrate for an optical fiber array, comprising a grooved portion for positioning a plurality of optical fibers, and wherein the grooved portion has a plurality of grooves formed such that the plurality of grooves are arranged in parallel with each other and such that each of the plurality of grooves is defined by two side walls which form therebetween an angle larger that 70° and smaller that 100°, the plurality of optical fibers being partly accommodated in the plurality of grooves, respectively, and thereby positioned on the grooved portion.

When the substrate of the present invention constructed as described above is used as a part of an optical fiber array, the optical fiber array is effectively protected against removal of the optical fibers from the substrate and an increase in the optical transmission loss of the optical fibers, while permitting a high degree of stability of positioning of the optical fibers. Thus, the reliability and quality of the optical fiber array are significantly improved.

The present substrate of the present invention is preferably formed by a press forming method, for increased efficiency of manufacture.

The second object indicated above may be achieved according to the present invention, which provides an optical fiber array comprising (a) a substrate having a shoulder and including a grooved portion and a planar portion which are formed integrally with each other on respective opposite sides of the shoulder, (b) the grooved portion of the substrate having a plurality of V-shaped grooves formed such that the plurality of V-shaped grooves are arranged in parallel with each other and such that each of the V-shaped grooves has a V-shape defined by two side walls which form a predetermined angle therebetween, the angle being gradually increased in a portion of the grooved portion of the side of the substrate, in a direction toward the shoulder, (c) a plurality of optical fibers partly accommodated within the plurality of V-shaped grooves, respectively, and thereby positioned on the grooved portion, the plurality of optical fibers being supported by the planar portion of the substrate, (d) a covering plate disposed on the grooved portion of the substrate, to force the optical fibers partly accommodated in the plurality of grooves of the grooved portion of the substrate, onto the two side walls of each V-shaped groove, to thereby position the optical fibers, and (e) adhesive layers formed so as to fill gaps between the optical fibers and the substrate and between the optical fibers and the covering plate, for integrally bonding the optical fibers to the substrate and covering plate.

In the optical fiber array of this invention constructed as described above, the angle of each V-shaped groove formed in the grooved portion of the substrate is gradually increased in the portion of the grooved portion on the side of the shoulder, so that the configuration of the V-shaped groove in the rear portion of the grooved portion ending at the rear edge provided by the shoulder adjacent to the planar portion is gradually changed, and the optical fiber accommodated in the rear portion of the V-shaped groove is spaced apart from the two side walls and is not in contact with the rear edge at the shoulder.

Therefore, the construction of the optical fiber array of this invention described above is effective to reduce the stress concentration on the optical fiber, which is caused by an adhesive layer formed on the planar portion, making it possible to effectively prevent an increase in the optical transmission loss of the optical fiber, and completely prevent damaging or breaking of the optical fiber due to its contact with the rear edge. Thus, the quality of the present optical fiber array is effectively improved.

The second object indicated above may also be achieved according to the present invention, which provides an optical fiber array comprising (a) a substrate having a shoulder and including a grooved portion and a planar portion which are formed integrally with each other on respective opposite sides of the shoulder, (b) the grooved portion of the substrate having a plurality of V-shaped grooves formed such that the plurality of V-shaped grooves are arranged in parallel with each other, such that each of the V-shaped grooves has a V-shaped, and such that a distance between a nominal level of the upper surface of the grooved portion and a bottom of the V-shaped groove is gradually increased in a portion of the grooved portion on the side of the substrate, in a direction toward the shoulder, (c) a plurality of optical fibers partly accommodated within the plurality of V-shaped grooves, respectively, and thereby positioned on the grooved portion, the plurality of optical fibers being supported by the planar portion of the substrate, (d) a covering plate disposed on the grooved portion of the substrate, to force the optical fibers partly accommodated in the plurality of grooves of the grooved portion of the substrate, onto two side walls defining each V-shaped groove, to thereby position the optical fibers, and (e) adhesive layers formed so as to fill gaps between the optical fibers and the substrate and between the optical fibers and the covering plate, for integrally bonding the optical fibers to the substrate and the covering plate.

In the optical fiber array of this invention constructed as described above, the distance between the nominal level of the upper surface of the grooved portion and the bottom of each V-shaped groove is gradually increased in the portion of the grooved portion on the side of the shoulder, so that the configuration of the V-shaped groove in the rear portion of the grooved portion ending at the rear edge provided by the shoulder is gradually changed, and the optical fiber partly accommodated in the rear portion of the V-shaped groove is space apart from the two side walls and is not in contact with the rear edge at the shoulder.

Therefore, the construction of the optical fiber array of this invention described above is effective to reduce the stress concentration on the optical fiber, which is caused by an adhesive layer formed on the planar portion, making it possible to effectively prevent an increase in the optical transmission loss of the optical fiber, and completely prevent damaging or breaking of the optical fiber due to its contact with the rear edge. Thus, the quality of the present optical fiber array is effectively improved.

The second object indicated above may also be achieved according to the present invention, which provides a substrate for an optical fiber array, comprising (a) a grooved portion for positioning a plurality of optical fibers, (b) a planar portion formed integrally with the grooved portion, with a shoulder being formed between the grooved and planar portions, the planar portion supporting the plurality of optical fibers positioned on the grooved portion, and (c) a plurality of V-shaped grooves formed in the grooved portion of the substrate such that the plurality of V-shaped grooves are arranged in parallel with each other and such that each of the V-shaped grooves has a V-shape defined by two side walls which form therebetween an angle which is gradually increased in a portion of the grooved portion on the side of the substrate, in a direction toward the shoulder, the plurality of optical fibers being partly accommodated in the plurality of grooves, respectively, and thereby positioned on the grooved portion.

The use of the substrate of the present invention described above as a part of an optical fiber array makes it possible to reduce the stress concentration on the optical fiber, which is caused by an adhesive layer formed on the substrate, and effectively prevent an increase in the optical transmission loss of the optical fiber, and completely prevent damaging or breaking of the optical fiber due to its contact with the rear edge of the V-shaped groove located at the shoulder. Thus, the reliability and quality of the optical fiber array are significantly improved.

In one preferred form of the optical fiber array substrate of the present invention, the angle indicted above is gradually increased in a portion of each V-shaped groove between a longitudinally intermediate part thereof and an end thereof on the side of the shoulder. In this case, the optical fiber is positioned with high stability by the portion of the V-shaped groove in which the angle is not changed.

The present optical fiber array substrate is preferably formed by a press forming method, for increased efficiency of manufacture.

The second object indicated above may also be achieved according to the present invention, which provides a substrate for an optical fiber array, comprising (a) a grooved portion for positioning a plurality of optical fibers, (b) a planar portion formed integrally with the grooved portion, with a shoulder being formed between the grooved and planar portions, the planar portion supporting the plurality of optical fibers positioned on the grooved portion, and (c) a plurality of V-shaped grooves formed in the grooved portion of the substrate such that the plurality of V-shaped grooves are arranged in parallel with each other, such that each of the V-shaped grooves has a V-shape, and such that a distance between a nominal level of the upper surface of the grooved portion and a bottom of the V-shaped groove is gradually increased in a portion of the grooved portion on the side of the substrate, in a direction toward the shoulder, the plurality of optical fibers being partly accommodated in the plurality of grooves, respectively, and thereby positioned on the grooved portion.

The use of the substrate of the present invention described above as a part of an optical fiber array also makes it possible to reduce the stress concentration on the optical fiber, which is caused by an adhesive layer formed on the substrate, and effectively prevent an increase in the optical transmission loss of the optical fiber, and completely prevent damaging or breaking of the optical fiber due to its contact with the rear edge of the V-shaped groove located at the shoulder. Thus, the reliability and quality of the optical fiber array are significantly improved.

In one preferred form of the optical fiber array substrate of the present invention described above, the distance between the nominal level of the upper surface of the grooved portion and the bottom of each V-shaped groove described above is gradually increased in a portion of each V-shaped groove between a longitudinally intermediate part thereof and an end thereof on the side of the shoulder. In this case, the optical fiber is positioned with high stability by the portion of the V-shaped groove in which the above-identified distance is not changed.

The present optical fiber array substrate is preferably formed by a press forming method, for increased efficiency of manufacture.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which.

DETAILED DESCRIPTION OF THE PREFERRED EMBODIMENTS

Referring first to FIGS. 1A and 1B, there will be briefly described embodiments of this invention. While FIGS. 1A and 1B show a conventional optical fiber array, these figures are referred to for illustrating a basic arrangement of an optical fiber array according to the present invention, which is similar to that of the conventional optical fiber array.

Like the conventional optical fiber array as shown in FIG. 1A, the optical fiber array 1 according to the present invention is constructed such that a plurality of optical fibers 2 are supported and fixed in an array between an substrate 3 for optical fiber array and a covering plate 4, in parallel with each other with a predetermined pitch.

Described in greater detail, the substrate 3 has a generally stepped-flat-plate configuration having a shoulder 9 at its longitudinally intermediate portion. The substrate 3 includes a grooved portion 3a located on one of opposite sides of the shoulder 9 as viewed in its longitudinal direction and having a plurality of grooves 5 formed in its upper surface for accommodating optical fibers 2, and a planar portion 3b located on the other side of the shoulder 9 and having a flat upper surface. Further, each of the grooves 5 formed in the grooved portion 3a is V-shaped in cross section, and is defined by adjacent two side walls inclined so as to form an angle θ therebetween, as shown in FIG. 1B, by way of example.

On the grooved portion 3a of the substrate 3 constructed as described above, there are arranged non-covered end portions 10 of the plurality of optical fibers 2, which extend from their covered portions 2a, such that the non-covered end portions 10 are accommodated n the respective grooves 5, in parallel with each other with the predetermined pitch T. The optical fibers 2 the non-covered end portions 10 of which are accommodated in the respective grooves 5 are supported at their covered portions 2a on the planar portion 3b of the substrate 3. Further, the non-covered end portions 10 of the optical fibers 2 accommodated in the grooves 5 are positioned in contact with the adjacent two side walls of the grooves 5 and a retainer surface (lower surface) of the covering plate 4 placed on the grooved portion 3a.

The non-covered end portion 10 of each optical fiber 2 is embedded within adhesive layers 6 formed in a gap 7 between the non-covered end portion 10 and the retainer surface of the covering plate 4 and a gap 8 between two side surfaces of each groove 5 and the non-covered end portion 10, while the covered portion 2a of each optical fiber 2 is embedded within an adhesive layer 6 (not shown in FIG. 1A) formed on the planar portion 3b. Thus, each optical fiber 2 is fixed to the substrate 3, in the optical fiber array 1.

In the optical fiber array 1 according to the present embodiment, the adhesive layers 6 are formed of a suitable adhesive agent, for example, an epoxy resin which is curable by a ultraviolet radiation and which has a viscosity of about 20 Pa·s before it is cured. The substrate 3 and the covering plate 4 are formed of a suitable glass or ceramic material having a coefficient of thermal expansion close to that of the optical fibers 2, for example, PYREX glass (registered trademark) or a quartz glass. The grooves 5 provided in the substrate 3 formed of such a material are formed by a suitable known method such as machining and press forming methods.

In the optical fiber array 1 according to the present embodiment constructed as described above, the angle θ defined by the two side surfaces of each groove 5, and a distance "m" between the substrate 3 and the covering plate 4 are determined so as to satisfy an inequality S1>S2, where "S1" represents a transverse cross sectional surface area of the gap 7 located above the non-covered end portion 10 of each optical fiber 2 accommodated in the groove 5 of the substrate 3 for optical fiber array, that is, formed between the non-covered end portion 10 and the retainer surface of the covering plate 4, while "S2" represents a transverse cross sectional surface area of the gap 8 located below the gap 7, that is, formed between the non-covered end portion 10 and the two side surfaces of the groove 5 in which the end portion 10 is accommodated. This arrangement of the optical fiber array 1 of the present embodiment is a significant feature not found in the conventional optical fiber array.

Figure 5:
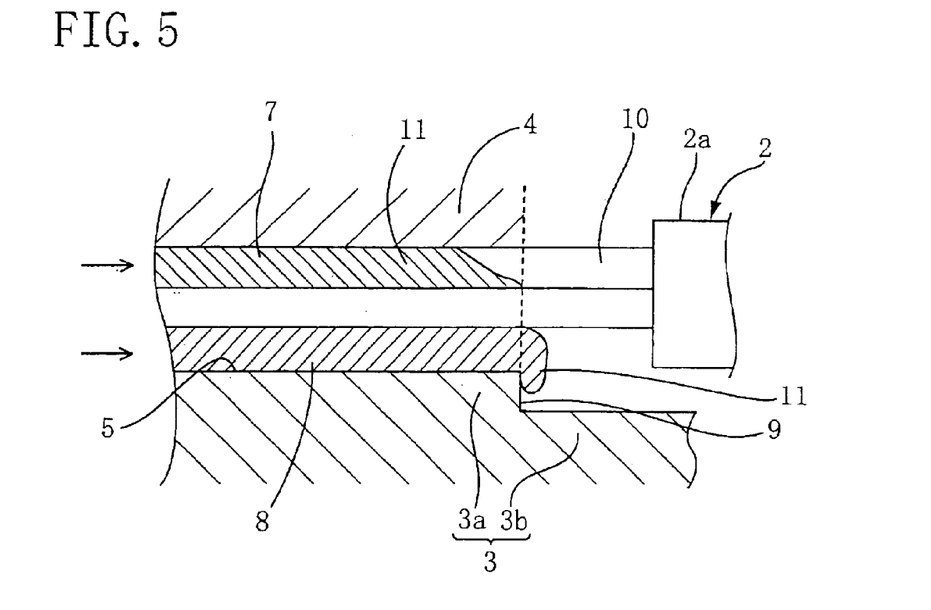
FIG. 5 is a view corresponding to that of FIG. 3, showing an example of a process of manufacturing an optical fiber array according to the principle of this invention.

In the manufacture of the optical fiber array 1 having this structural feature, the optical fibers 2 are fixed to the substrate 3 by forming the adhesive layers 6 described above, more specifically, by injecting an adhesive agent 11 for forming the adhesive layers 6 into each groove 5 through a distal open end of the groove 5 located at the distal end of the substrate 3 (which open end is remote from the shoulder 9), as shown in FIG. 5, so that owing to capillarity, the injected adhesive agent 11 fills the gap 7 located above the non-covered end portion 10 in each groove 5 and the gap 8 located below the gap 7. Since the transverse cross sectional surface area S2 of the gap 8 (hereinafter referred to s "lower gap") located below the non-covered end portion 10 is smaller that the transverse cross sectional surface area S1 of the gap 7 (hereinafter referred to as "upper gap") located above the non-covered end portion 10, the velocity at which the adhesive agent 11 is injected into the lower gap 8 is higher than the velocity at which the adhesive agent 11 is injected into the upper gap 7. As a result, the adhesive agent 11 injected into the lower gap 8 reaches the rear open end of the groove 5 before the adhesive agent 11 injected into the upper gap 7 reaches the rear open end. After the lower gap 8 is filled with the adhesive agent 11, the upper gap 7 is filled with the adhesive agent 11.

Accordingly, the optical fiber array 1 according to the present embodiment is advantageously arranged to avoid trapping or presence of air P in the gap 8 (as shown in FIG. 3) between the non-covered end portion 10 of the optical fiber 2 accommodated in each groove 5 and the two side surfaces of the groove 5, during formation of the adhesive layers 6, that is, due to a difference between the velocities of injection of the adhesive agent 11 into the upper gap 7 and the lower gap 8 in the step of fixing the optical fibers 2 to the substrate 3. In the absence of the air P in the gap 8, the present optical fiber array 1 is effectively protected against reduction in the force of bonding of the optical fibers 2 to the substrate 3, which gives rise to a risk of removal of the optical fibers 2 from the substrate 3, bending or straining of the optical fibers 2 due to thermal expansion and contraction of the air P, which causes an increase in optical transmission loss of the optical fiber.

A relationship between the transverse cross sectional surface areas S1 and S2 of the gap 7 and the gap 8, which is the advantageous structural feature of the present embodiment, changes depending upon an outside diameter "d" of the non-covered end portion 10 of the optical fiber 2, the spacing pitch T of the optical fibers 2, the angle Θ between the two side surface of the groove 5, and the shape of the groove 5, which are indicated in FIG. 1B.

Where the ordinary standardized optical fibers 2 the non-covered end portion 10 of which has the outside diameter "d" of 125 μm are used, for example, the transverse cross sectional surface area S1 of the upper gap 7 can be easily made larger by increasing the spacing pitch T of the optical fibers 2. On the other hand, the transverse cross sectional surface area S2 of the lower gap 8 can be comparatively easily made smaller by increasing the angle θ between the two side surfaces of the groove 5.

However, the spacing pitch T of the optical fibers 2 is recently made almost equal to the outside diameter of the non-covered end portion 10, to meet a recently increasing requirement for a reduced size and increased degree of integration of a light conductor to which the optical fiber array 1 is to be connected. In this respect, the spacing pitch T must be determined to meet this requirement. It is also noted that an excessively large increase in the angle θ between the two side surfaces of the groove 5 causes undesirable instability of positioning of the optical fiber 2. Therefore, the spacing pitch T of the optical fibers 2 and the angle θ between the two side surface of the groove 5 must be suitably determined while taking account of those aspects.

Figure 2:
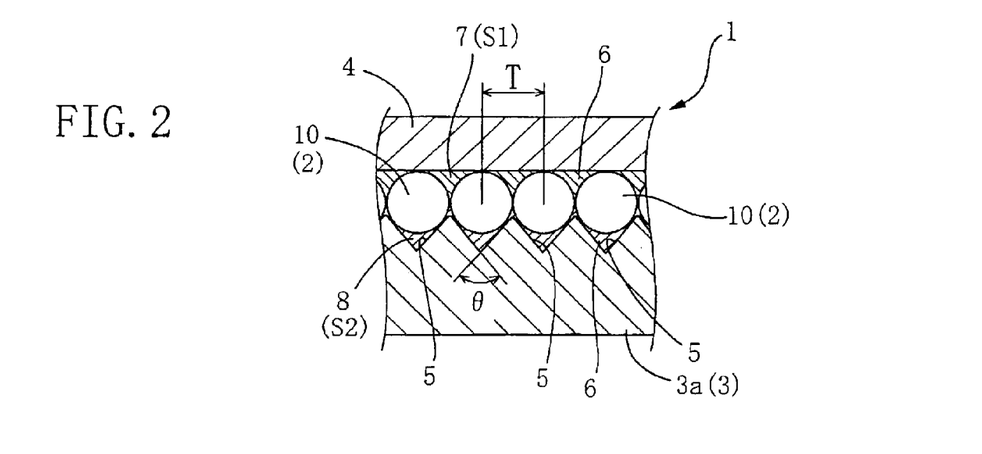
FIG. 2 is a view corresponding to that of FIG. 1B, showing a conventional optical fiber array different from that shown in FIGS. 1A and 1B.
Figure 6:
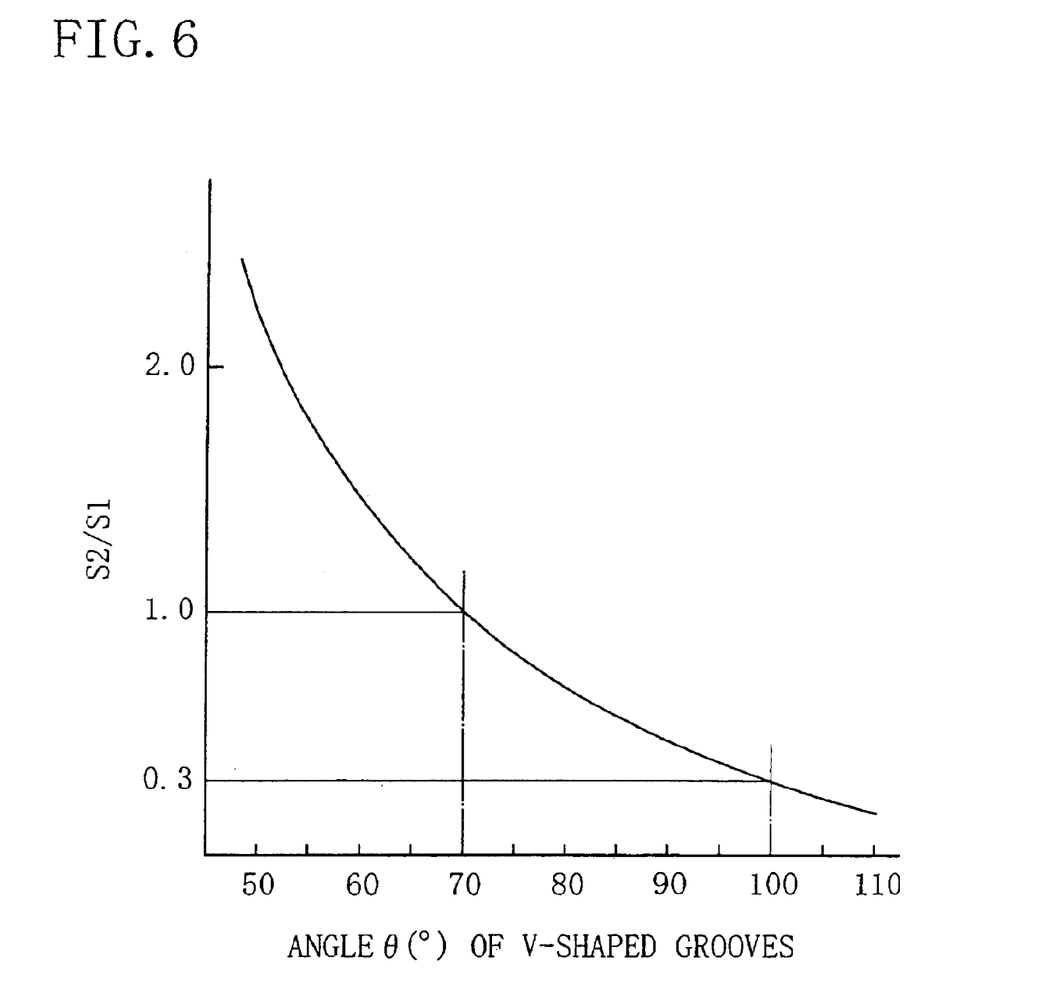
FIG. 6 is a graph indicating a relationship between an angle of V-shaped grooves formed in a substrate of an optical fiber array, and a ratio of a cross sectional surface area of a lower gap to that of an upper gap.

Referring to the graph of FIG. 6, there is indicated a relationship between a ratio S2/S1 of the transverse cross sectional surface area S2 of the lower gap 8 to the transverse cross sectional surface area S1, to the angle θ between the two side surfaces of the groove 5, in the high-density optical fiber array 1 as shown in FIG. 2 wherein the spacing pitch T of the optical fibers 2 is close to the outside diameter "d" of the non-covered end portion 10 of each optical fiber 2, namely, the spacing pitch T is 127 μm, and the outside diameter "d" is 125 μm, while each groove 5 is V-shaped in cross section.

It will be understood from FIG. 6 that the angle θ of each V-shaped groove 5 is required to be larger than 70°, in order to reduce the ratio S2/S1 to be smaller than "1", that is, in order that the transverse cross sectional surface area S1 of the upper gap 7 is larger than the transverse cross sectional surface area S2 of the lower gap 8. However, an excessively large increase in the angle will cause lateral displacement of the optical fiber 2 within the V-shaped groove 5, leading to instability of positioning of the optical fiber 2, as indicated above. To prevent such lateral displacement of the optical fiber 2 within the V-shaped groove 5 and assure stable positioning of the optical fiber 2, the ratio S2/S1 is preferably larger than 0.3. Accordingly, the angle θ of the V-shaped groove 5 is preferably smaller than 100°.

That is, the optical fiber array 1 wherein each optical fiber 2 has the outside diameter "d" of 125 μm and the spacing pitch T of the optical fibers 2 is 127 μm is given a sufficiently high degree of stability of positioning of each optical fiber 2, and is sufficiently effectively protected against removal of the optical fibers 2 from the substrate 3 and an increase in the optical transmission loss of the optical fibers 2, where the angle θ of each V-shaped groove 5 is larger than 70° and smaller than 100°. Preferably, the angle of the V-shaped grooves 5 is set to be about 60°.

Figure 7:
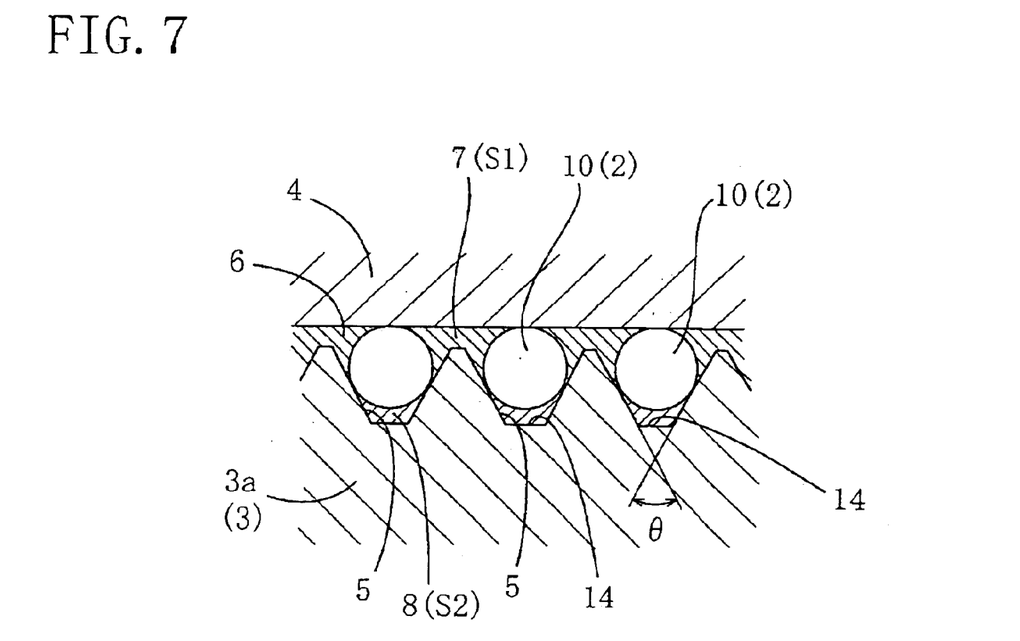
FIG. 7 is a schematic enlarged cross sectional view corresponding to that of FIG. 1B, showing a part of an optical fiber array according to another embodiment of this invention.

However, the grooves 5 in which the optical fibers 2 are accommodated need not be V-shaped in cross section, and may have any other cross sectional shape. For example, the grooves 5 may have an inverted trapezoidal shape in cross section, with their bottom 14 having a flat surface, as shown in FIG. 7. In this case, however, the grooves 5 of trapezoidal shape are required to be formed so as to prevent the optical fibers 2 from contacting the flat bottom surface 14.

In the case where the grooves 5 have an inverted trapezoidal shape, too, the transverse cross sectional surface area S2 of the lower gap 8 formed between the non-covered end portion 10 of each optical fiber 2 and the corresponding groove 5 can be made smaller while assuring stable positioning functioning of the grooves 5, as in the case where the grooves 5 are V-shaped. If the angle θ of the inverted trapezoidal grooves 5 is the same as that of the V-shaped grooves 5, the ratio S2/S1 can be further reduced. If the ratio of S2/S1 of the inverted trapezoidal grooves 5 is the same as that of the V-shaped grooves 5, the angle θ of the inverted trapezoidal grooves 5 can be further reduced.

Figure 8:
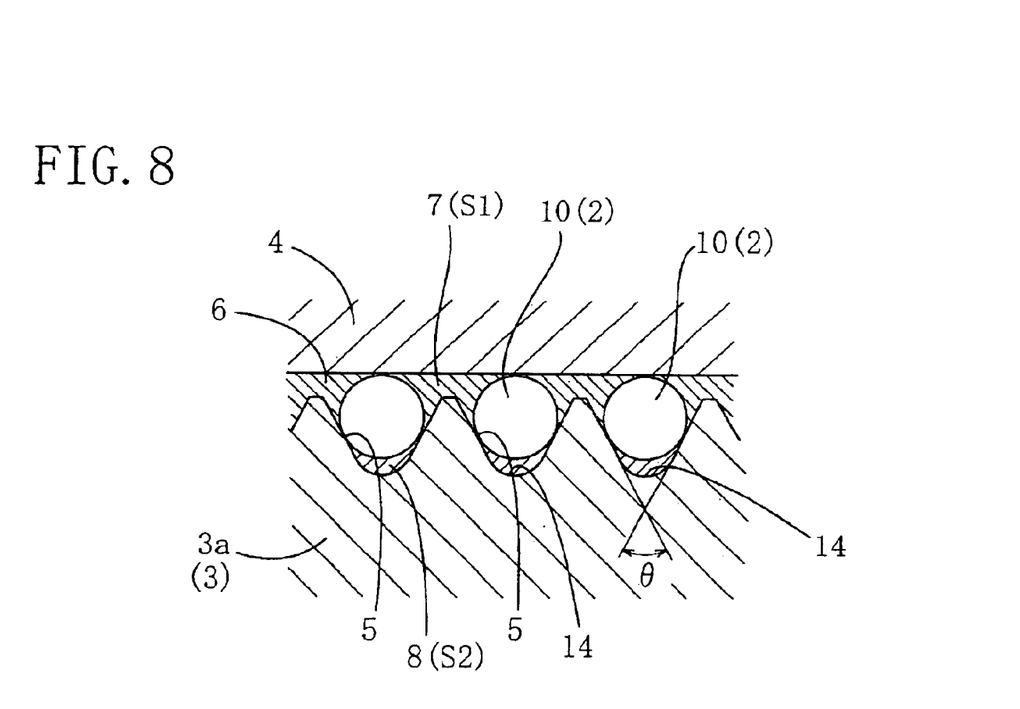
FIG. 8 is a view corresponding to that of FIG. 7, showing an optical fiber array according to a further embodiment of this invention.

Alternatively, the grooves 5 may be U-shaped in cross section, with their bottom 14 having an acruate surface, as shown in FIG. 8. In this case, however, the U-shaped grooves 5 are required to be formed so as to prevent the optical fibers 2 from contacting the arcuate bottom surface 14, and so as to have the same angle as that of the V-shaped grooves 5. Like the embodiment wherein the grooves 5 have an inverted trapezoidal shape, the present embodiment wherein the grooves 5 are U-shaped can enjoy the advantage described above.

Figure 9:
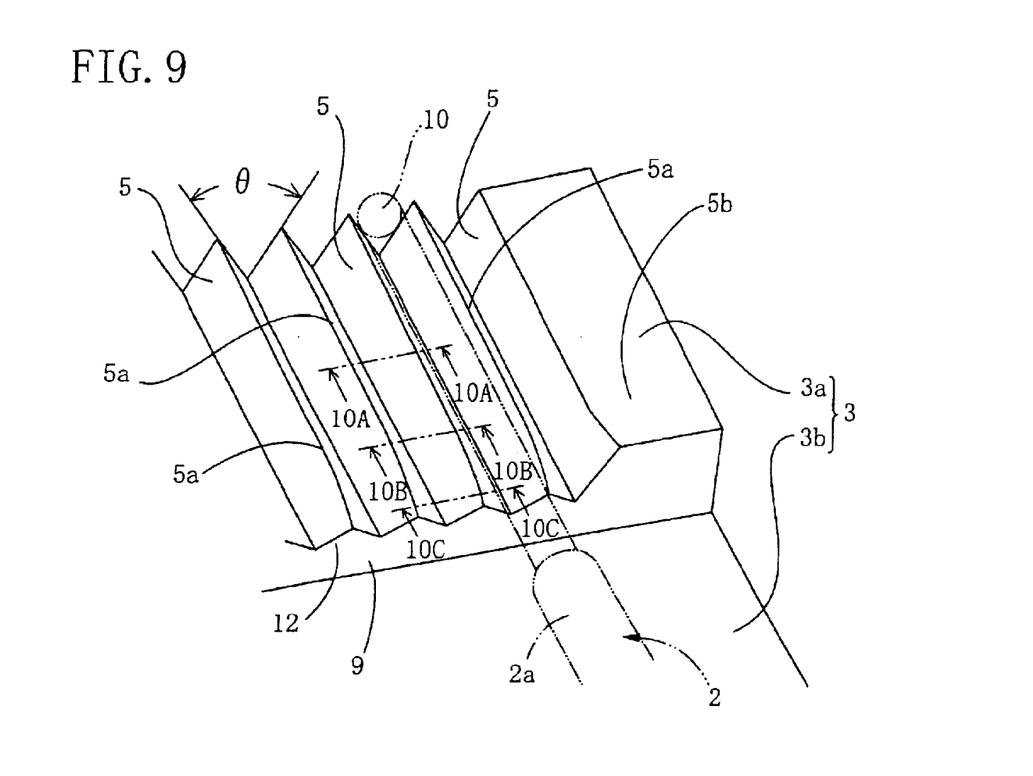
FIG. 9 is a fragmentary perspective view showing an example of a substrate of an optical fiber array according to this invention.
Figure 10:
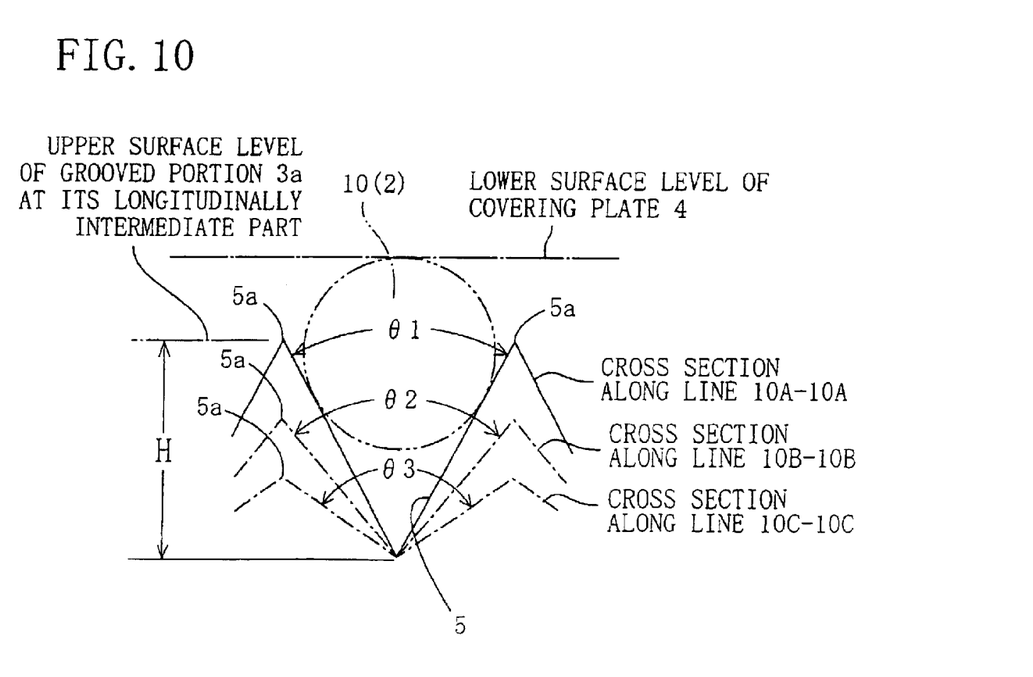
FIG. 10 is a schematic view illustrating cross sections taken along a line 10A—10A, a line 10B—10B and a line 10C—10C of FIG. 9.

Referring next to FIGS. 9 and 10, there is schematically illustrated one example of the substrate 3 for optical fiber array of the optical fiber array 1 according to the present invention. It is to be understood that the same reference signs as used in FIGS. 1A, 1B and 2 are used in FIGS. 9 and 10 and in FIGS. 11 and 12 to which reference will be made, to identify the functionally corresponding elements or portions, which will not be described in detail.

As is apparent from FIGS. 9 and 10, the V-shaped grooves 5 are formed in the grooved portion 3a fo the substrate 3 for optical fiber array in the present embodiment, such that the angle θ of each V-shaped groove 5 is gradually and smoothly increased in a direction toward the shoulder 9 at the rear end of the grooved portion 3a, and such that a distance H between the nominal upper surface level of the grooved portion 3a as measured at its longitudinally intermediate part and the bottom of the V-shaped groove 5 is held constant over the entire length of the V-shaped groove 5.

In this embodiment of FIGS. 9 and 10 wherein the distance between the adjacent V-shaped grooves 5 is determined to minimize the spacing pitch (T) of the non-covered end portions 10 (not shown) accommodated in the respective V-shaped grooves 5, the crests 5a are sharpened so as to gradually reduce the depth of each V-shaped groove 5 between its crest 5a and the bottom. Where the spacing pitch (t) of the non-covered end portions (10) is relatively large, and the crests 5a have flat end faces, on the other hand, the flat end faces of the crests 5a are gradually narrowed at the near end part of the groove 5, like a widthwise end section 5b of the grooved portion 3a of the substrate 3, as indicated in FIG. 9. Further, the distance H between the nominal upper surface level of the grooved portion 3a as measured at its longitudinally intermediate part and the bottom of the V-shaped groove 5 may be changed in the longitudinal direction of the V-shaped groove 5.

In the substrate 3 for optical fiber array according to the present embodiment, the angle θ of the V-shaped grooves 5 is gradually increased in a rear portion of the length of the grooves 5 from the longitudinally intermediate position to the rear end defined by the shoulder 9, and is held constant in the other front portion which is remote from the shoulder 9. This arrangement permits stable positioning of each optical fiber 2 within the front portion of the V-shaped groove 5 in which the angle θ of the groove 5 is held constant.

The angle θ of the V-shaped grooves 5 and the distance between the substrate 3 and the covering plate 4 are preferably determined such that the transverse cross sectional area S1 of the upper gap 7 is larger than the transverse cross sectional surface area S2 of the lower gap 8, as described above, even in the front end portion of the substrate 3. Where the optical fibers 2 are arranged with a relatively high density, as shown in FIG. 2, the angle θ of each V-shaped groove 5 in the front end portion of the substrate 3 is preferably larger than 70° and smaller than 100°, for the reason described above in detail.

In the substrate 3 for optical fiber array constructed as described above and having the V-shaped grooves 5, the upper and lower gaps 7, 8 formed between the V-shaped grooves 5 and the covering plate are gradually increased in the direction toward the shoulder 9 of the grooved portion 3a, so that the transverse cross sectional areas S1, S2 of the upper and lower gaps 7, 8 are made larger in their rear portions on the side of the shoulder 9, whereby the adhesive agent (11) can be easily introduced into the upper and lower gaps 7, 8, for forming the adhesive layers (6) in the optical fiber array 1.

Where the substrate 3 for optical fiber array is constructed as described above, the upper and lower gaps 7, 8 can be smoothly filled with the adhesive agent 11, owing to the capillarity, without trapping of air (P) within the gaps, by injecting the adhesive agent 11 through their open ends at the end of the substrate 3 on the side of the shoulder 9. Thus, the optical fiber array 1 can be advantageously manufactured without any of the above-described problems which would take place in the presence of the trapped air (P).

In the present substrate 3 for optical fiber array, the configuration of a part of the grooved portion 3a which is near the shoulder 9 is gradually changed so as to reduce the amount of stress concentration on the non-covered end portions (10) of the optical fibers (2) due to the adhesive layer (6) formed on the planar portion 3b, making it possible to prevent an increase in the optical transmission loss of the optical fibers (2).

In addition, a rear portion of the non-covered end portion 10 (indicated in two-dot chain line in FIGS. 9 and 10) of the optical fiber 2 on the side of the shoulder 9 is spaced apart from the two side surfaces of the corresponding V-shaped groove 5 by a distance which increases in the direction toward the shoulder 9, so that the rear end of the non-covered end portion 10 is spaced apart from the side surfaces by a considerable distance at the rear edge 12. This spaced-apart arrangement of the rear portion of the non-covered end portion 10 with respect to the rear edge 12 is very effective to prevent damaging or breaking of the optical fiber 2 (at its non-covered end portion 10) which would be caused by a contact of the optical fiber 2 with the rear edge 12. To more effectively prevent the damaging or breaking of the optical fiber 2, the rear lower edge of the covering plate (4) placed on the grooved portion 3a of the substrate 3 is preferably rounded, so as to form a rounded corner 15 at the same position as the shoulder 9, as shown in FIG. 4.

Figure 11:
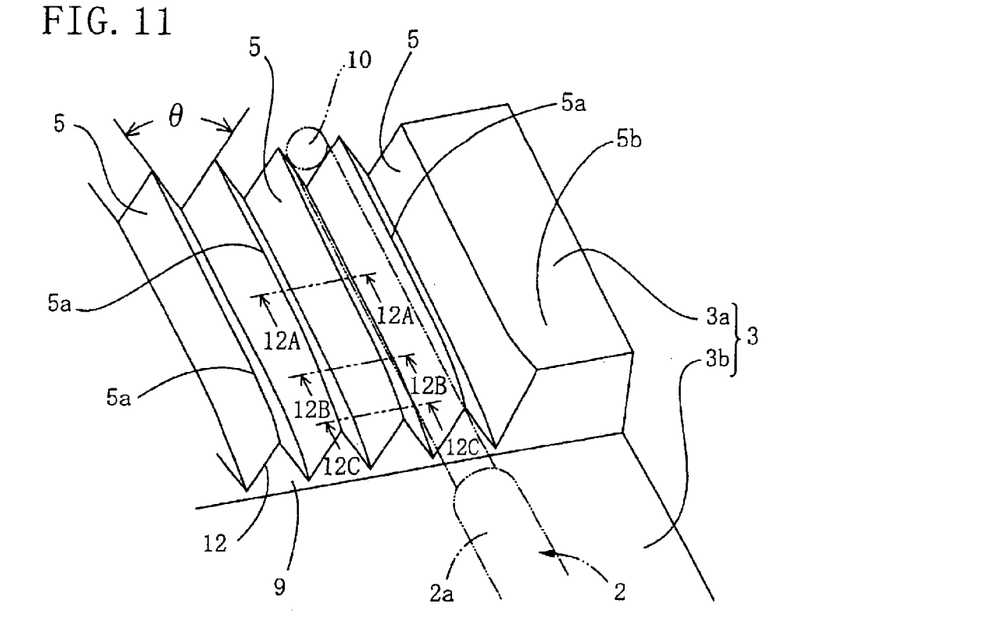
FIG. 11 is a fragmentary perspective view showing another example of the substrate of the optical fiber array according to this invention.
Figure 12:
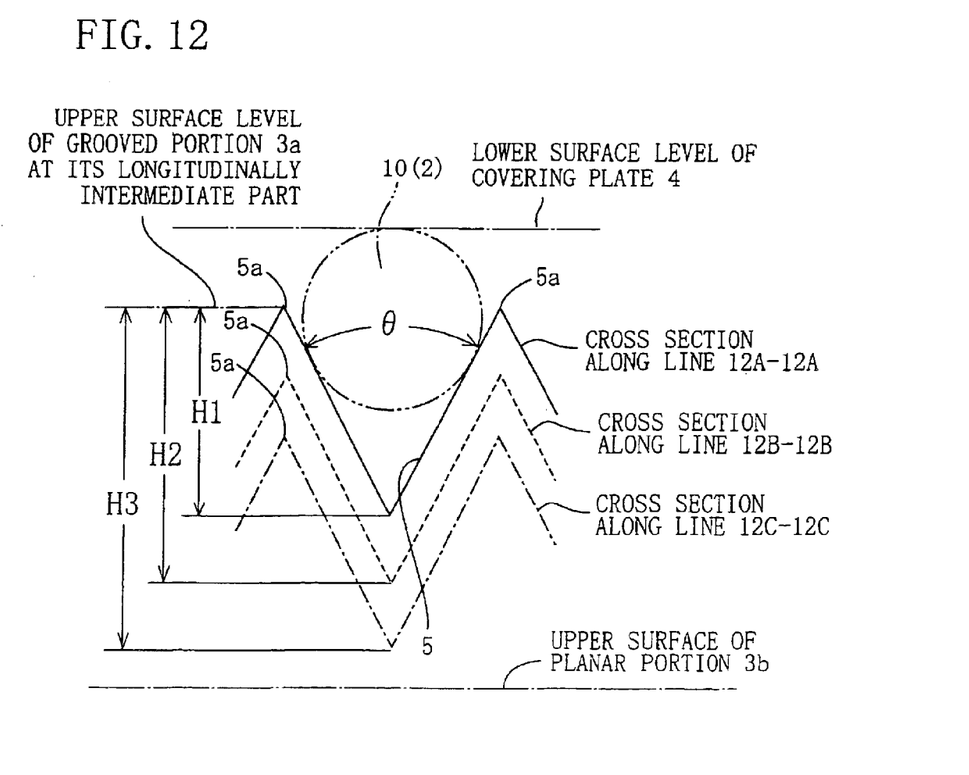
FIG. 12 is a schematic view illustrating cross sections taken along a line 12A—12A, a line 12B—12B and a line 12C—12C of FIG. 11.

Referring to FIGS. 11 and 12, there is schematically illustrated another example of the substrate 3 for optical fiber array of the optical fiber array 1 according to the present invention. As is apparent from FIGS. 11 and 12, the V-shaped grooves 5 are formed in the substrate 3 for optical fiber array in the present embodiment, such that a distance H between the nominal upper surface level of the grooved portion 3a as measured at its longitudinally intermediate part and the bottom of the V-shaped grooves 5 is gradually and smoothly increased in a direction toward the shoulder 9 at the rear end of the grooved portion 3a, as indicated at H1, H2, and H3 by way of example in FIG. 12, and such that the angle θ of the V-shaped grooves 5 is held constant over the entire length of the V-shaped groove 5.

In this embodiment wherein the distance between the adjacent V-shaped grooves is determined to minimize the spacing pitch (T) of the non-covered end portions 10 (not shown) accommodated in the respective V-shaped grooves 5, the crests 5a are sharpened so as to gradually reduce their height as the distance H between the nominal upper surface level of the grooved portion 3a as measured at its longitudinally intermediate part and the bottom of the V-shaped groove 5 is gradually increased, so that the depth of the V-shaped groove 5 from its crest 5a to its bottom is held constant over the entire length of the V-shaped groove 5. Where the spacing pitch (T) of the non-covered end portions (10) is relatively large, and the crests 5a have flat end faces, on the other hand, the flat end faces of the crests 5a are gradually narrowed at the rear end part of the groove 5, like the widthwise end section 5b of the grooved portion 3a of the substrate 3, as indicated in FIG. 11. Further, the angle of the V-shaped groove 5 may be changed as the distance H between the nominal upper surface level of the grooved portion 3a as measured at its longitudinally intermediate part and the bottom of the V-shaped groove 5 is gradually increased.

In the substrate 3 for optical fiber array according to the present embodiment, the distance H between the nominal upper surface level of the grooved portion 3a as measured at its longitudinally intermediate part and the bottom of the V-shaped groove 5 is gradually increased in the rear portion of the length of the grooves 5 from the longitudinally intermediate position to the rear end defined by the shoulder 9, and is held constant at H1 in the other front portion which is remote from the shoulder 9. This arrangement permits stable positioning of each optical fiber 2 within the front portion of the V-shaped groove 5 in which the distance H between the nominal upper surface level of the grooved portion as measured 3a at its longitudinally intermediate part and the bottom of the V-shaped groove 5 is held constant.

The angle θ of the V-shaped grooves 5 and the distance between the substrate 3 and the covering plate 4 are preferably determined such that the transverse cross sectional area S1 of the upper gap 7 is larger than the transverse cross sectional surface area S2 of the lower gap 8, as described above, even in the front end portion of the substrate 3. Where the optical fibers 2 are arranged with a relatively high density, as shown in FIG. 2, the angle θ of each V-shaped groove 5 in the front end portion of the substrate 3 is preferably larger than 70° and smaller than 100°, for the reason described above in detail.

In the substrate 3 for optical fiber array constructed as described above and having the V-shaped grooves 5, the upper and lower gaps 7, 8 formed between the V-shaped grooves 5 and the covering plate are gradually increased in the direction toward the shoulder 9 of the grooved portion 3a, so that the transverse cross sectional areas S1, S2 of the upper and lower gaps 7, 8 are made larger in their rear portions on the side of the shoulder 9, as in the preceding embodiment of FIGS. 9 and 10, whereby the adhesive agent (11) can be easily introduced into the upper and lower gaps 7, 8, for forming the adhesive layers (6) in the optical fiber array 1.

Where the substrate 3 for optical fiber array is constructed as described above, the upper and lower gaps 7, 8 can be smoothly filled with the adhesive agent 11, owing to the capillarity, without trapping of air (P) within the gaps, by injecting the adhesive agent 11 through their open ends at the end of the substrate 3 on the side of the shoulder 9. Thus, the optical fiber array 1 can be advantageously manufactured without any of the above-described problems which would take place in the presence of the trapped air (P).

In the present substrate 3 for optical fiber array, the configuration of a part of the grooved portion 3a which is near the shoulder 9 is gradually changed so as to reduce the amount of stress concentration on the non-covered end portions (10) of the optical fibers (2) due to the adhesive layer (6) formed on the planar portion 3b, making it possible to prevent an increase in the optical transmission loss of the optical fibers (2).

In addition, a rear portion of the non-covered end portion 10 (indicated by two-dot chain line in FIGS. 11 and 12) of the optical fiber 2 on the side of the shoulder 9 is spaced apart from the two side surfaces of the corresponding V-shaped groove 5 by a distance which increases in the direction toward the shoulder 9, so that the rear end of the non-covered end portion 10 is spaced apart from the side surface by a considerable distance at the rear edge 12. This spaced-apart arrangement of the rear portion of the non-covered end portion 10 with respect to the rear edge 12 is very effective to prevent damaging or breaking of the optical fiber 2 (at its non-covered end portion 10) which would be caused by a contact of the optical fiber 2 with the rear edge 12. To more effectively prevent the damaging or breaking of the optical fiber 2, the rear lower edge of the covering plate (4) placed on the grooved portion 3a of the substrate 3 is preferably rounded, so as to form the rounded corner 15 at the same position as the shoulder 9, as shown in FIG. 4.

The optical fiber array may be constructed so as to employ a combination of the structural feature shown in FIGS. 9 and 10 and the structural feature shown in FIGS. 11 and 12. That is, the optical fiber array may be constructed such that the angle θ of each V-shaped groove 5 is gradually increased in the rear portion of the grooved portion 3a on the side of the shoulder 9 while at the same time the distance H between the nominal upper surface level of the grooved portion 3a as measured at its longitudinally intermediate part and the bottom of the V-shaped groove 5 is gradually increased in the rear portion of the grooved portion 3a on the side of the shoulder 9. Although the configuration of the V-shaped groove 5 is more or less complicated in this modified arrangement, this modification enjoys the same advantages as the preceding embodiments.

The substrate 3 for optical fiber array constructed as described above is preferably formed by a press forming method using upper and lower molds. Since the V-shaped grooves 5 to be formed in the substrate 3 do not have a uniform cross sectional shape in the longitudinal direction, the manufacture of the substrate 3 by a grinding or machining operation requires an intricate and accurate control, and tends to suffer from a comparatively low degree of productivity. On the other hand, the manufacture of the substrate 3 by a press forming operation requires a comparatively high cost of manufacture of the molds, but permits a higher degree of productivity than the manufacture by the grinding or machining operation, owing to repeated use of the molds. Further, the V-shaped grooves 5 formed in the substrate 3 by the press forming operation have more uniform surface roughness and higher surface smoothness than those formed by the grinding or machining operation, so that the adhesive agent 11 can be more easily introduced into the upper and lower gaps 7, 8 formed between the V-shaped grooves 5 and the covering plate 4. Accordingly, the substrate 3 manufactured by the press forming operation has higher degrees of reliability and quality when it is manufactured alone or as a part of the optical fiber array 1.

It is to be understood that the present invention may be embodied with various other changes, modifications and improvements, which may occur to those skilled in the art, without departing from the spirit and scope of the invention defined in the following claims.

What is claimed is:

1. An optical fiber array comprising:
   a substrate having a shoulder and including a grooved portion and a planar portion which are formed integrally with each other on respective opposite sides of said shoulder;
   said grooved portion of said substrate having a plurality of grooves formed such that said plurality of grooves are arranged in parallel with each other and such that each of said plurality of grooves is defined by two side walls which form a predetermined angle therebetween;
   a plurality of optical fibers partly accommodated within said plurality of grooves, respectively, and thereby positioned on said grooved portion, said plurality of optical fibers being supported by said planar portion of said substrate;
   a covering plate disposed on said grooved portion of said substrate, to force said optical fibers partly accommodated in said plurality of grooves of said grooved portion, onto said two side walls of said each groove, to thereby position said optical fibers; and
   adhesive layers formed so as to fill gaps between said optical fibers and said substrate and between said optical fibers and said covering plate, for integrally bonding said optical fibers to said substrate and said covering plate,
   and wherein said gaps consists of a gap having a transverse cross sectional surface area S1 and formed between each of said optical fibers and an upper surface of said grooved portion of said substrate, and a lower surface of said covering plate, and a gap having a transverse cross sectional surface area S2 and formed between said two side walls of each of said grooves and said each optical fiber, said transverse cross sectional surface areas S1 and S2 being determined to satisfy and inequality S1>S2.

2. The optical fiber array according to claim 1, wherein each of said optical fibers has an outside diameter of 125 $\mu$m and said optical fibers are arranged with a spacing pitch of 127 $\mu$m, said predetermined angle formed between said two side walls of said each groove is larger that 70° and smaller than 100°.

3. The optical fiber array according to claim 1, wherein each of said grooves is a V-shaped groove.

4. The optical fiber array according to claim 1, wherein each of said grooves is a groove having an inverted trapezoidal shape.

5. The optical fiber array according to claim 1, wherein each of said grooves is a U-shaped groove.

6. The optical fiber array according to claim 3, wherein said predetermined angle formed between said two side walls of said V-shaped groove is gradually increased in a portion of said grooved portion of said substrate on the side of said shoulder, in a direction toward said shoulder.

7. The optical fiber array according to claim 3, wherein a distance between a nominal level of said upper surface of said grooved portion and a bottom of said V-shaped groove is gradually increased in a portion of said grooved portion of said substrate on the side of said shoulder, in a direction toward said shoulder.

8. A substrate for an optical fiber array according to claim 1, wherein each of said plurality of grooves defined by said two side walls form therebetween an angle larger than 70° and smaller than 100°.

9. The substrate according to claim 8, which is formed by a press forming method.

10. An optical fiber array comprising:
    a substrate having a shoulder and including a grooved portion and a planar portion which are formed integrally with each other on respective opposite sides of said shoulder;
    said grooved portion of said substrate having a plurality of V-shaped grooves formed such that said plurality of V-shaped grooves are arranged in parallel with each other and such that each of said V-shaped grooves has a V-shape defined by two side walls which form therebetween an angle which becomes gradually larger in a direction toward said shoulder;
    a plurality of optical fibers partly accommodated within said plurality of V-shaped grooves, respectively, and thereby positioned on said grooved portion, said plurality of optical fibers being supported by said planar portion of said substrate;
    a covering plate disposed on said grooved portion of said substrate, to force said optical fibers partly accommodated in said plurality of grooves of said grooved portion of said substrate, onto said two side walls of said each V-shaped groove, to thereby portion said optical fibers; and
    adhesive layers formed so as to fill gaps between said optical fibers and said substrate and between said optical fibers and said covering plate, for integrally bonding said optical fibers to said substrate and said covering plate.

11. An optical fiber array comprising:
    a substrate having a shoulder and including a grooved portion and a planar portion which are formed integrally with each other on respective opposite sides of said shoulder;
    said grooved portion of said substrate having a plurality of V-shaped grooves formed such that said plurality of V-shaped grooves are arranged in parallel with each other, such that each of said V-shaped grooves has a V-shape, and such that a distance between a nominal level of said upper surface of said grooved portion and a bottom of said V-shaped groove becomes gradually greater in a direction toward said shoulder;

a plurality of optical fibers partly accommodated within said plurality of V-shaped grooves, respectively, and thereby positioned on said grooved portion, said plurality of optical fibers being supported by said planar portion of said substrate;

a covering plate disposed on said grooved portion of said substrate, to force said optical fibers partly accommodated in said plurality of grooves of said grooved portion of said substrate, onto two side walls defining said each V-shaped groove, to thereby position said optical fibers; and adhesive layers formed so as to fill gaps between said optical fibers and said substrate and between said optical fibers and said covering plate, for integrally bonding said optical fibers to said substrate and said covering plate.

12. A substrate for an optical fiber array, comprising:

a grooved portion for positioning a plurality of optical fibers;

a planar portion formed integrally with said grooved portion, with a shoulder being formed between said grooved and planar portions, said planar portion supporting said plurality of optical fibers positioned on said grooved portion; and said grooved portion of said substrate having a plurality of V-shaped grooves formed such that said plurality of V-shaped grooves are arranged in parallel with each other and such that each of said V-shaped grooves has a V-shape defined by two side walls which form therebetween an angle which becomes gradually larger in a direction toward said shoulder, said plurality of optical fibers being partly accommodated in said plurality of grooves, respectively, and thereby positioned on said grooved portion.

13. The substrate according to claim 12, wherein said angle is gradually increased in a portion of said each V-shaped groove between a longitudinally intermediate part thereof and an end thereof on the side of said shoulder.

14. The substrate according to claim 12, which is formed by a press forming method.

15. A substrate for an optical fiber array comprising:

a grooved portion for positioning a plurality of optical fibers;

a planar portion formed integrally with said grooved portion, with a shoulder being formed between said grooved and planar portions, said planar portion supporting said plurality of optical fibers positioned on said grooved portion; and said grooved portion of said substrate having a plurality of V-shaped grooves formed such that said plurality of V-shaped grooves are arranged in parallel with each other, such that each of said V-shaped grooves has a V-shape, and such that a distance between a nominal level of said upper surface of said grooved portion and a bottom of said V-shaped groove becomes gradually larger in a direction toward said shoulder, said plurality of optical fibers being partly accommodated in said plurality of grooves, respectively, and thereby positioned on said grooved portion.

16. The substrate according to claim 15, wherein said distance is gradually increased in a portion of said each V-shaped groove between a longitudinally intermediate part thereof and an end thereof on the side of said shoulder.

17. The substrate according to claim 15, which is formed by a press forming method.

* * * * *